UNITED STATES PATENT OFFICE.

CLARENCE E. MURRELL, OF ROCKAWAY BEACH, NEW YORK, ASSIGNOR TO RESEARCH CORPORATION, OF NEW YORK, N. Y., A CORPORATION OF NEW YORK.

RECOVERING BROMIN.

1,292,016.  Specification of Letters Patent.  Patented Jan. 21, 1919.

No Drawing.  Application filed June 6, 1918. Serial No. 238,520.

*To all whom it may concern:*

Be it known that I, CLARENCE E. MURRELL, a citizen of the United States, residing at Rockaway Beach, in the county of Queens and State of New York, have invented certain new and useful Improvements in Recovering Bromin, of which the following is a specification.

This invention is a novel method whereby bromin may be recovered in a substantially quantitative and highly economical manner from air or other gases carrying free bromin. My invention is preferably carried out as follows:—

The bromin-laden gas, such for instance as air which has been charged with bromin by blowing brines containing free bromin, or otherwise, is first treated in a moving column with either gaseous or aqueous ammonia in sufficient proportion to unite with the bromin, with the production of a fume consisting of ammonium bromid. The air column or stream may be subjected to a mixing operation in any desired way in order to insure completeness of this reaction, as for example by passing it over baffles or over obstructing surfaces, by mechanical mixing, or otherwise. At this stage the ammonium bromid is carried in suspension by the moving column of gas from which it was derived.

The gas carrying the suspended fume passes next to an electrical precipitator in which it is subjected to a high tension discharge, preferably a direct current discharge. Thereby the ammonium bromid is precipitated upon the collecting electrode, and is directly recoverable either in solid form or as a solution of any desired concentration.

The high tension discharge exerts an intense mixing action upon the gases subjected to it, and thereby practically assures completeness of the reaction, without the use of ammonia in any material excess of the theoretical proportion required for the production of the bromid.

I claim:—

Process of recovering bromin from gas-mixtures containing the same, comprising treating such mixtures with ammonia to produce a fume of ammonium bromid, and precipitating said fume by means of a high tension electric discharge.

In testimony whereof, I affix my signature.

CLARENCE E. MURRELL.